United States Patent
Nissilä

(10) Patent No.: US 10,972,315 B2
(45) Date of Patent: Apr. 6, 2021

(54) OFDM SIGNAL AND NOISE ESTIMATION

(71) Applicant: Nordic Semiconductor ASA, Trondheim (NO)

(72) Inventor: Mauri Nissilä, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/961,117

(22) PCT Filed: Oct. 25, 2018

(86) PCT No.: PCT/GB2018/053098
§ 371 (c)(1),
(2) Date: Jul. 9, 2020

(87) PCT Pub. No.: WO2019/138207
PCT Pub. Date: Jul. 18, 2019

(65) Prior Publication Data
US 2020/0336339 A1    Oct. 22, 2020

(30) Foreign Application Priority Data
Jan. 12, 2018  (GB) ..................... 1800554

(51) Int. Cl.
*H04L 25/02*  (2006.01)
*H04B 17/327* (2015.01)
*H04B 17/345* (2015.01)

(52) U.S. Cl.
CPC ....... *H04L 25/0204* (2013.01); *H04B 17/327* (2015.01); *H04B 17/345* (2015.01); *H04L 25/0224* (2013.01)

(58) Field of Classification Search
CPC ............. H04L 25/0204; H04L 25/0224; H04L 27/2611; H04L 27/2647; H04L 25/0228;
(Continued)

(56) References Cited

U.S. PATENT DOCUMENTS

2003/0231725 A1* 12/2003 Scarpa ................. H04L 25/022
                                                              375/350
2010/0285766 A1   11/2010 Okino et al.
(Continued)

FOREIGN PATENT DOCUMENTS

EP    1 401 164 A1    3/2004
EP    2 538 589 A1   12/2012
(Continued)

OTHER PUBLICATIONS

Communication Relating to the Results of the Partial International Search Report for PCT/GB2018/053098, dated Jan. 7, 2019, 23 pages.
(Continued)

*Primary Examiner* — Fitwi Y Hailegiorgis
(74) *Attorney, Agent, or Firm* — Klarquist Sparkman, LLP (57) ABSTRACT

A signal estimator for an OFDM radio receiver is configured to generate a signal power estimate for a reference signal received on a subcarrier from a plurality of OFDM subcarriers. The signal estimator generates a first channel estimate as a first function of a first set of one or more unfiltered reference-signal channel estimates, where the first set includes an unfiltered reference-signal channel estimate. It generates a second channel estimate as a second function of a second set of one or more unfiltered reference-signal channel estimates, where the second set has no unfiltered reference-signal channel estimate in common with the first set. The signal estimator then generates the signal power estimate by multiplying the first channel estimate with the second channel estimate, such that the generated signal power estimate does not increase with the absolute square of any of the unfiltered reference-signal channel estimates in the first and second sets.

15 Claims, 3 Drawing Sheets

(58) Field of Classification Search
CPC .. H04B 17/327; H04B 17/345; H04B 17/309;
H04B 17/318
USPC .................................. 375/227, 350; 348/607
See application file for complete search history.

(56) References Cited

U.S. PATENT DOCUMENTS

2013/0271664 A1* 10/2013 Mathew .................. H04N 5/21
348/607
2014/0192937 A1 7/2014 Seyama et al.
2016/0135066 A1 5/2016 Xu et al.

FOREIGN PATENT DOCUMENTS

EP 2 582 112 A1 4/2013
EP 2 608 472 A1 6/2013

OTHER PUBLICATIONS

IPO Search Report under Section 17(5) for GB1800554.6, dated Jun. 18, 2018, 5 pages.
IPO Search Report under Section 17(5) for GB1800554.6, dated Sep. 27, 2018,.
International Search Report and Written Opinion for PCT/GB2018/053098, dated Mar. 4, 2019, 24 pages.
Wang et al., "A Primer on 3GPP Narrowband Internet of Things (NB-Iot)," Internet Citation, XP002772811, Retrieved from the Internet: URL:https://arxiv.org/ftp/arxiv/papers/1606/1606.04171.pdf, Jun. 13, 2020, 8 pages.

* cited by examiner

OFDM SIGNAL AND NOISE ESTIMATION

CROSS REFERENCE TO RELATED APPLICATIONS

This is the U.S. National Stage of International Application No. PCT/GB2018/053098, filed Oct. 25, 2018, which was published in English under PCT Article 21(2), which in turn claims the benefit of Great Britain Application No. 1800554.6, filed Jan. 12, 2018.

BACKGROUND OF THE INVENTION

This invention relates to signal and noise estimation in Orthogonal Frequency Division Multiplexing (OFDM) radio receivers.

OFDM is a form of radio transmission that is used in various radio protocols such as Long Term Evolution (LTE), various IEEE 802.11 standards, DAB radio, DVB-T, and WMAX. Rather than encoding data on a single carrier frequency, a data stream is spread over multiple closely-spaced subcarriers. The subcarriers are orthogonal to avoid mutual interference. This approach can provide increased resilience to multipath fading and to external interference.

It is known for an OFDM radio transmitter to transmit predetermined reference signals at predefined time slots and frequencies, where the reference signals, time slots and frequencies are known in advance by the radio receiver. In LTE, these reference signals are predetermined QPSK di-bits, known as cell-specific reference signal (CRS) resource elements (RE); every third subcarrier carries reference signals, at predetermined intervals. A radio receiver can use these reference signals to generate channel estimates for individual subcarriers. These can then be used to calculate estimates of signal power and signal-to-noise ratio for a particular subcarrier.

For each reference signal i (e.g., for each CRS resource element in LTE), an unfiltered channel estimate, $\hat{h}_{CRS}(i)$ can be obtained for the particular reference signal position.

A filtered channel estimate for a particular reference signal i can also be calculated by applying a filter to a set of unfiltered channel estimates for reference signals received around the particular reference signal i in time and/or frequency—i.e. within a time and frequency window around the particular reference signal. The filter may be defined by a set of coefficients or weights $\alpha_j$ that are applied to the set of reference signals as follows:

$$\hat{h}_{filt}(i) = \left(\alpha_{-\lfloor\frac{K}{2}\rfloor}\hat{h}_{CRS}\left(i - \left\lfloor\frac{K}{2}\right\rfloor\right) + \ldots + \alpha_{-1}\hat{h}_{CRS}(i-1) + \alpha_0 \hat{h}_{CRS}(i) + \ldots + \alpha_{\lfloor\frac{K}{2}\rfloor}\hat{h}_{CRS}\left(i + \left\lfloor\frac{K}{2}\right\rfloor\right)\right),$$

where $\Sigma_j \alpha_j = 1$, and where K+1 represents the area of the filter in time and/or frequency. The filter represents a weighted averaging over time and frequency. Note that the indexing of the reference signals is only intended to be illustrative here; the indexing will, in practice, need to be updated as the filter moves over the channel in time and/or frequency.

A signal power estimate, $\hat{P}_S$, for a particular reference signal i (corresponding to a particular subcarrier frequency and time instant) might then be calculated as the absolute square of the filtered channel estimate, as follows:

$$\hat{P}_s(i) = |\hat{h}_{filt}(i)|^2.$$

An instantaneous noise power estimate, $\hat{P}_N$, for a particular reference signal might be obtained by subtracting the filtered channel estimate from the unfiltered channel estimate, as follows:

$$\hat{P}_N(i) = |\hat{h}_{CRS}(i) - \hat{h}_{filt}(i)|^2.$$

An estimate of the noise power averaged over the whole system bandwidth, or over a particular channel, might then be calculated as:

$$\hat{P}_N = \Sigma_i |\hat{h}_{CRS}(i) - \hat{h}_{filt}(i)|^2.$$

A signal-to-noise-ratio (SNR) estimator, $\hat{\gamma}(i)$, for a particular reference signal, i, can then be calculated by dividing the estimated signal power of the reference signal by the averaged noise power over the whole system bandwidth or channel, as follows:

$$\hat{\gamma}(i) = \frac{\hat{P}_S(i)}{\hat{P}_N}.$$

Such an approach generally works well at high SNR levels, but can sometimes be inaccurate, especially at low signal-to-noise ratios.

One non-limiting situation where reliable performance at low SNRs is important is in the coverage extended (CE) mode of LTE cat-M1 and LTE cat-NB1, where a radio receiver may be operating at SNR=−15 dB or even −20 dB. The applicant has found that, for example, the channel state information (CSI)-based link adaption can perform very badly when using SNR estimators as described above in such contexts.

The present invention therefore seeks to provide improved signal and noise power estimators that are more reliable, including at low SNR levels.

SUMMARY OF THE INVENTION

From a first aspect, the invention provides a method of generating a signal power estimate for a particular reference signal received on a particular subcarrier, from among a plurality of OFDM subcarriers, the method comprising:
 generating a first channel estimate as a first function of a first set of one or more unfiltered reference-signal channel estimates, the first set including an unfiltered reference-signal channel estimate for the particular reference signal;
 generating a second channel estimate as a second function of a second set of one or more unfiltered reference-signal channel estimates, wherein the second set of unfiltered reference-signal channel estimates has no unfiltered reference-signal channel estimate in common with the first set of unfiltered reference-signal channel estimates; and
 generating the signal power estimate, wherein generating the signal power estimate comprises multiplying the first channel estimate by the second channel estimate, such that the generated signal power estimate does not increase with the absolute square of any of the unfiltered reference-signal channel estimates in the first and second sets.

From a further aspect, the invention provides a signal estimator for an OFDM radio receiver, wherein the signal estimator is configured to generate a signal power estimate for a particular reference signal received on a particular subcarrier, from among a plurality of OFDM subcarriers, by:

generating a first channel estimate as a first function of a first set of one or more unfiltered reference-signal channel estimates, the first set including an unfiltered reference-signal channel estimate for the particular reference signal;

generating a second channel estimate as a second function of a second set of one or more unfiltered reference-signal channel estimates, wherein the second set of unfiltered reference-signal channel estimates has no unfiltered reference-signal channel estimate in common with the first set of unfiltered reference-signal channel estimates; and generating the signal power estimate, wherein generating the signal power estimate comprises multiplying the first channel estimate by the second channel estimate, such that the generated signal power estimate does not increase with the absolute square of any of the unfiltered reference-signal channel estimates in the first and second sets.

Thus it will be seen that, in accordance with these aspects of the invention, instead of taking the absolute square of the filtered channel estimate as a signal power estimate for a particular subcarrier, as has been done in the past, the present signal estimator generates a signal power estimate that does not include any squared terms for the unfiltered channel estimates used in the estimation. In particular, it does not include a squared term for the unfiltered channel estimate for the particular reference signal. This has been found to have a beneficial effect in removing a source of significant error at low SNR levels. It therefore provides a more reliable estimate of signal power, which can be used reliably even in very low SNR contexts. A mathematical analysis that demonstrates this is provided below.

The first function may be a non-linear function, but in a preferred set of embodiments it is a linear function of the first set of unfiltered reference-signal channel estimates. Each unfiltered reference-signal channel estimate of the first set may be multiplied by a respective reference-signal coefficient from a first set of reference-signal coefficients. The estimator may be configured to store data representative of each resulting product in an electronic memory of the estimator. The first function may be, or include, the sum of these (one or more) products, or may be, or include, the complex conjugate of the sum of these products. The first function may generate the complex conjugate of said sum. In some embodiments, these reference-signal coefficients may be identical (e.g., all having a value of one), but in other embodiments at least two of the coefficients differ from each other. In some embodiments, the first set of unfiltered reference-signal channel estimates consists of only the unfiltered reference-signal channel estimate for the particular reference signal. The first channel estimate may then simply equal the unfiltered reference-signal channel estimate for the particular reference signal. However, in other embodiments, the first set may contain two, three, four or more unfiltered reference-signal channel estimates.

The second function may be a non-linear function, but in a preferred set of embodiments it is a linear function of the second set of unfiltered reference-signal channel estimates. Each unfiltered reference-signal channel estimate of the second set may be multiplied by a respective reference-signal coefficient from a second set of reference-signal coefficients. The estimator may be configured to store data representative of each resulting product in an electronic memory of the estimator. The second function may be, or include, the sum of these (one or more) products, or may be, or include, the complex conjugate of the sum of these products. In some embodiments, these reference-signal coefficients may be identical (e.g., all having a value of one), but in other embodiments at least two of the coefficients differ from each other. The second set of unfiltered reference-signal channel estimate preferably contains a plurality of unfiltered reference-signal channel estimates.

The first and second sets of unfiltered reference-signal channel estimate may, between them, contain unfiltered reference-signal channel estimates for all the reference signals received by the OFDM radio receiver within a predetermined time and frequency window containing the particular reference signal. The time and frequency window may span only a single subcarrier, but preferably spans a plurality of subcarriers. The time and frequency window may span a time interval only one symbol period long, but preferably spans a plurality of symbol periods. It may be rectangular in a plot of time against frequency (e.g., a resource grid), or may have any other appropriate shape.

From another aspect, the invention provides a method of generating a noise power estimate for a particular reference signal received on a particular subcarrier, from among a plurality of OFDM subcarriers, the method comprising generating the noise power estimate as the absolute square of a difference divided by a constant factor, wherein:

the difference is between i) an unfiltered channel estimate for the particular reference signal and ii) a filtered channel estimate for the particular reference signal;

the filtered channel estimate for the particular reference signal is the sum of the products of i) unfiltered reference-signal channel estimates for a filter set of reference signals with ii) respective reference-signal coefficients from a filter set of reference-signal coefficients;

the filter set includes the particular reference signal;

the respective reference-signal coefficients sum to one; and the constant factor is equal to one minus the respective reference-signal coefficient for the particular reference signal.

From a further aspect, the invention provides a noise estimator for an OFDM radio receiver, wherein the noise estimator is configured to generate a noise power estimate for a particular reference signal received on a particular subcarrier, from among a plurality of OFDM subcarriers, as the absolute square of a difference divided by a constant factor, wherein:

the difference is between i) an unfiltered channel estimate for the particular reference signal and ii) a filtered channel estimate for the particular reference signal;

the filtered channel estimate for the particular reference signal is the sum of the products of i) unfiltered reference-signal channel estimates for a filter set of reference signals with ii) respective reference-signal coefficients from a filter set of reference-signal coefficients;

the filter set includes the particular reference signal;

the respective reference-signal coefficients sum to one; and the constant factor is equal to one minus the respective reference-signal coefficient for the particular reference signal.

Thus it will be seen that, in accordance with these aspects of the invention, instead of simply using the absolute square of the difference between a filtered channel estimate and an unfiltered channel estimate, as has been done in the past, here a constant factor that depends on the reference-signal coefficients used in the filtered channel estimate is additionally applied to the estimate. This has been found to have a beneficial effect in removing a source of bias, as explained in more detail below, so as to provide a more accurate estimate of noise power.

The noise estimator may be further configured to generate an averaged noise power estimate over a noise-analysis set of subcarriers, such as over all the subcarriers that carry reference signals in an OFDM transmission bandwidth or in an OFDM channel. It may do this by generating a plurality of noise power estimates (which may include at least one for each subcarrier in a noise-analysis set of subcarriers), and calculating a linear average (i.e., arithmetic mean) of the noise power estimates. Alternatively, any other appropriate averaging or smoothing process may be employed. A plurality of noise power estimates may be averaged over time, as well as over frequency. The noise-analysis set preferably comprises a plurality of subcarriers. The filter set of reference signals may be received over the plurality of OFDM subcarriers (i.e., including reference signals received on at least two different respective carrier frequencies). The noise-analysis set may include all the plurality of OFDM subcarriers over which the filter set of reference signals are received, from which the filtered channel estimate is generated for a particular reference signal, but it may be a different set, such as a superset of these filter subcarriers. The noise-analysis set preferably includes the particular subcarrier on which the aforesaid particular reference signal is received.

The signal estimator may be further configured to generate a signal-to-noise-ratio estimate for a particular subcarrier by calculating a ratio between the signal power estimate for a particular reference signal received on the particular subcarrier and an averaged noise power estimate generated by a noise estimator as described above. The signal estimator may receive the averaged noise power estimate from the noise estimator, or the signal estimator may comprise the noise estimator.

From another aspect, the invention provides a signal-to-noise-ratio estimator for an OFDM radio receiver, wherein the signal-to-noise-ratio estimator comprises a signal estimator as disclosed herein and a noise estimator as disclosed herein. The noise estimator may be configured to generate an averaged noise power estimate over a noise-analysis set of OFDM subcarriers. The signal-to-noise-ratio estimator may be configured to generate a signal-to-noise-ratio estimate for a particular subcarrier by calculating a ratio between a signal power estimate for a particular reference signal received on the particular subcarrier, generated by the signal estimator, and the averaged noise power estimate generated by the noise estimator.

The particular subcarrier may be a subcarrier in the noise-analysis set of OFDM subcarriers, although this is not essential.

From another aspect, the invention provides an OFDM radio receiver comprising a noise estimator and/or a signal estimator and/or a signal-to-noise-ratio estimator as disclosed herein.

The method of generating a signal power estimate for a particular reference signal received on a particular subcarrier may further comprise estimating a signal-to-noise ratio for the particular reference signal or subcarrier. This may comprise calculating a ratio between a signal power estimate for the particular reference signal and an averaged noise power estimate, averaged over a noise-analysis set containing a plurality of noise power estimates. The averaged noise power estimate may be determined by generating at least one respective noise power estimate for each subcarrier in a noise-analysis set containing a plurality of subcarriers, preferably using a method as disclosed herein, and averaging the respective noise power estimates. This averaging may be a linear averaging.

Each of the noise power estimates in the noise-analysis set may be generated as the absolute square of a difference divided by a constant factor, wherein:

the difference is between i) an unfiltered channel estimate for the particular reference signal and ii) a filtered channel estimate for the particular reference signal;

the filtered channel estimate for the particular reference signal is the sum of the products of i) unfiltered reference-signal channel estimates for a filter set of reference signals with ii) respective reference-signal coefficients from a filter set of reference-signal coefficients;

the filter set includes the particular reference signal;

the respective reference-signal coefficients sum to one; and the constant factor is equal to one minus the respective reference-signal coefficient for the particular reference signal.

A noise estimator embodying any aspect of the invention may generate the filtered channel estimate by multiplying each of the unfiltered reference-signal channel estimates for the filter set by the respective reference-signal coefficient to generate a set of products. Data representative of these products may be stored in an electronic memory of the estimator. The estimator may be configured to add the resulting products to generate the filtered channel estimate. In other embodiments, the estimator may generate the filtered channel estimate by performing a different, but mathematically-equivalent, set of operations.

In some embodiments, configured to generate both a noise power estimate and a signal power estimate, the filter set used for the noise power estimate may be identical to the union of the first and second sets used for the signal power estimate.

Data representative of the first, second or filtered channel estimate may be stored in an electronic memory of the estimator. This data could encode or represent the channel estimate in any appropriate way. For example, in some embodiments, a value may be stored that is an invertible function of the sum of said products, and the estimator may be configured to apply a corresponding inverse function when generating the signal or noise power estimate.

The reference-signal coefficients are preferably non-complex numbers. The reference-signal coefficients taken from the first and second set of reference-signal coefficients preferably together sum to one (unity). For the filter set in the noise estimator, the reference-signal coefficient associated with the unfiltered reference-signal channel estimate for the particular reference signal may be the largest coefficient in the set of reference-signal coefficients. Similarly, for the first set and/or second set in the signal estimator, the reference-signal coefficient associated with the unfiltered reference-signal channel estimate for the particular reference signal may be the largest coefficient in the set or sets of reference-signal coefficients. The reference-signal coefficients may represent a surface over frequency and time that is symmetric in frequency and/or that is symmetric in time. The surface may be centred on the particular reference signal in frequency and/or time. The filter set may comprise reference elements received over a set of adjacent subcarriers or over a regularly-spaced subset of a set of adjacent subcarriers—e.g., every third subcarrier from a set of 72 successive subcarriers covering one 1.4 MHz LTE-M channel (Long Term Evolution machine-type communications). The reference-signal coefficients may all be non-zero. The reference-signal coefficients may be constants, or may change over time—e.g., they may be updated by the radio receiver in response to changing conditions.

The signal estimator may perform one or more additional steps or operations when generating the signal power estimate. It may determine the real component of the product of the first channel estimate with the second channel estimate. In some embodiments, it may divide this real component by a scaling factor, wherein the scaling factor is equal to the sum of all the respective reference-signal coefficients that are taken from the aforesaid second set of reference-signal coefficients to be multiplied with the one or more unfiltered reference-signal channel estimates from the second set. In some embodiments, the signal power estimate may be the result of this division. Such a scaling factor may scale the estimate so as to remove bias from the estimate. The signal estimator may store an intermediate result from any of the steps described herein in an electronic memory. In some embodiments, the scaling factor may be equal to the constant factor used by the noise estimator.

Some embodiments of the signal estimator may generate the signal power estimate by performing different, but mathematically-equivalent, steps to those disclosed herein.

The noise estimator may store data representative of the absolute square of the difference between the filtered channel estimate for the particular reference signal and the unfiltered channel estimate for the particular reference signal in an electronic memory of the noise estimator. It may divide this by the constant factor.

In other embodiments, the noise estimator may generate the noise power estimate by a different, mathematically-equivalent, set of operations. For example, in one set of embodiments, the noise estimator is configured to calculate a modified filtered channel estimate that is equal to the filtered channel estimate minus the product of the unfiltered reference-signal channel estimate with the respective reference-signal coefficient for the particular reference signal. It may divide this modified filtered channel estimate by the constant factor—i.e., by unity minus the reference-signal coefficient corresponding to the particular reference signal. It may subtract the result of this division from the unfiltered reference-signal channel estimate for the particular reference signal. It may calculate the absolute square of the result of this subtraction, as the noise power estimate. A noise power estimate generated in this way still satisfies the definition of the noise estimator given above. Such an implementation may be desirable because the same modified filtered channel estimate may also be used as the second channel estimate in certain implementations of a signal estimator as disclosed herein. A device that embodies both the noise estimator and the signal estimator (e.g., an SNR estimator as disclosed herein) may therefore advantageously generate such a modified filtered channel estimate and use it to generate both a noise power estimate and a signal power estimate (and hence a signal-to-noise ratio). This can increase the efficiency of the device compared with implementation that do not share any intermediate calculation operations.

The unfiltered reference-signal channel estimates may be determined from one or more reference signals, such as LTE Cell-Specific Reference Signals (CRS) resource elements (RE). They may be updated over time as new reference signals are received. The estimators may generate estimates at intervals—e.g., every time a new reference signal is received.

The signal estimator may be configured to generate a set of signal power estimates and to apply an averaging or smoothing operation to the set of signal power estimates, over time. The averaging operation may output a time-averaged estimate. Similarly, the noise estimator may be configured to generate a set of noise power estimates and to apply an averaging or smoothing operation to the set of noise power estimates over time. The SNR estimator may be configured to generate a set of SNR estimates and to apply an averaging or smoothing operation to the set of SNR estimates over time.

Each of the signal estimator, noise estimator, and SNR estimator may comprise electronic circuitry for performing the described operations. It may be an electronic circuit or circuit portion. It may be implemented using application-specific circuitry (e.g., an ASIC), or it may comprise one or more FPGAs, MCUs and/or processors, which may include one or more GPUs or DSPs. The estimator may perform some or all operations in hardware, or may perform some or all operations in software. In some embodiments, the estimator may be purely software—i.e., consisting of software instructions which, when executed on a suitable processing system, cause the processing system to perform the described operations. Aspects of the invention extend to computer software, and to tangible medium bearing the same, such as a memory chip, which implement a signal estimate, or a noise estimator, or an SNR estimator as disclosed herein. In other embodiments, however, any of the estimators may be, or may comprise, hardware. An estimator may be a hard-coded logic device—i.e., comprising no software—but each estimator may instead comprise a memory storing instructions for execution on a processor, such as a DSP. The estimator may comprise an interface (e.g., a register interface) for receiving data representing the unfiltered reference-signal channel estimates for a filter set of reference signals, or it may be configured to generate these unfiltered reference-signal channel estimates from other signal data. It may comprise an output (e.g., a register interface) for outputting data representative of a generated estimate. The estimator may be integrated in a radio-on-a-chip device. The signal estimator and the noise estimator may be embodied by a single device. They may be combined to form an SNR estimator, as described herein.

The subcarriers may be Long Term Evolution (LTE) subcarriers, NarrowBand IoT (NB-IoT) subcarriers, IEEE 802.11 subcarriers, DAB radio subcarriers, DVB-T subcarriers, VViMAX subcarriers, or subcarriers of any other radio protocol. In some embodiments they are subcarriers in an LTE-M channel or a NB-IoT channel.

The reference signals are preferably known to the estimator. They may consist of one or more symbols in a phase-modulated and/or frequency-modulated and/or amplitude-modulated radio communication or radio protocol. Methods disclosed herein may comprise receiving and/or demodulating the particular reference signal on the particular subcarrier. However, this is not essential, since the noise or signal estimators may be separate from the radio receiver system and could even be embodied in a different device from the radio receiver such as on a network server, with data representing the particular reference signal being sent to the estimator. Each reference signal may be a QPSK di-bit, having a predetermined phase. The reference signals may be transmitted by an OFDM radio transmitter. They may be transmitted on every subcarrier in an OFDM channel, or only on a subset of the subcarriers in the channel. They may be transmitted at periodic intervals for a particular subcarrier.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
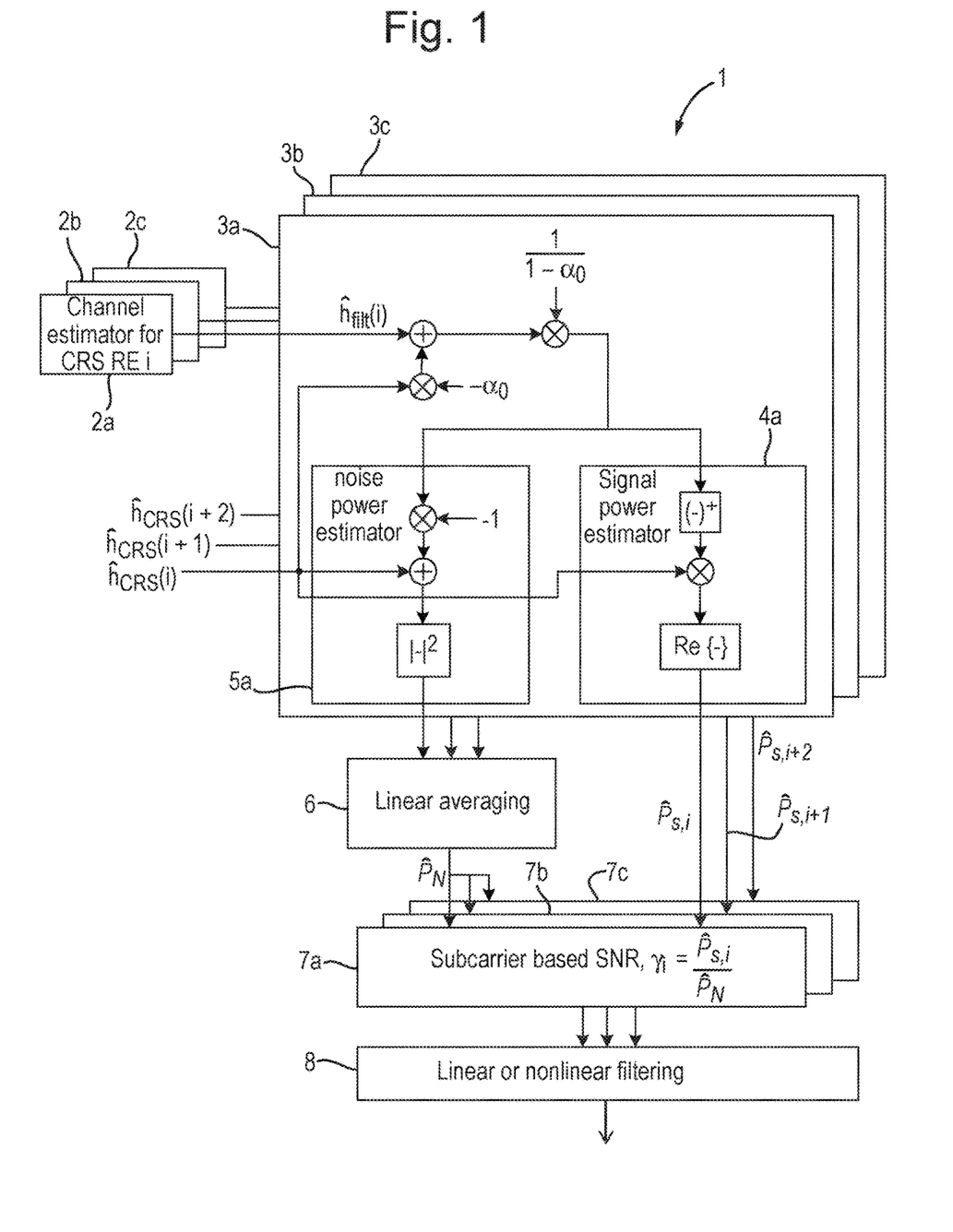
FIG. 1 is a schematic diagram of signal-to-noise-ratio (SNR) estimator embodying the invention.

FIG. 1 shows the key functional blocks in an SNR estimator 1 embodying the invention. It incorporates a signal estimator and a noise estimator, each embodying other aspects of the invention.

The SNR estimator 1 may be implemented in software executing on a DSP, although in other embodiments some or all of its functions could be hardwired (e.g., as digital logic on an integrated-circuit chip), or performed by an FPGA, or implemented in software executing on one or more general-purpose processors.

The SNR estimator 1 will initially be described in the context of an LTE Category M1 (LTE-M) radio receiver chip, which is a low-power specification of LTE, intended for Internet-of-Things (IoT) data exchange over cellular networks. It operates in a channel having a bandwidth of 1.4 MHz, which is divided into 72 orthogonal subcarriers. Data is transmitted using OFDM. Predefined CRS resource elements (RE) are transmitted on every third subcarrier, at known times for each subcarrier. The radio receiver receives 48 CRS elements every 1 millisecond (corresponding to one subframe). These allow the radio receiver to generate unfiltered channel estimates for each of the CRS-bearing subcarriers for particular instants in time corresponding to the CRS elements. A filtered channel estimate can be obtained by calculating a weighted average over a set of subcarriers (i.e., averaging over frequency) and over a number of time instants (e.g., averaging over time). These filtering processes reduce noise in the channel estimates.

Using the terminology introduced previously, a filtered channel estimate for a particular CRS resource element i (which is an example of a "particular reference signal", as described above) can be expressed as:

$$\hat{h}_{filt}(i) = \left(\alpha_{-\lfloor \frac{K}{2} \rfloor} \hat{h}_{CRS}\left(i - \left\lfloor \frac{K}{2} \right\rfloor\right)\right) + \ldots +$$
$$\alpha_{-1}\hat{h}_{CRS}(i-1) + \alpha_0 \hat{h}_{CRS}(i) + \ldots + \alpha_{\lfloor \frac{K}{2} \rfloor} \hat{h}_{CRS}\left(i + \left\lfloor \frac{K}{2} \right\rfloor\right),$$

where $\Sigma_j \alpha_j = 1$, for a filter set of reference-signal coefficients, $\alpha_j$, and where K+1 is the size of the filter (in time and frequency).

For example, for LTE-M, K+1 might equal thirty-two, with the filter window spanning sixteen CRS-bearing subcarriers in frequency and one millisecond in time.

In the frequency axis (i.e., ignoring time), the weights $\alpha_j$ may slope up linearly from $\alpha_{-\lfloor K/2 \rfloor}$ to a mid-point at $\alpha_0$ and then slope down linearly to $\alpha_{\lfloor K/2 \rfloor}$. However, other filter shapes are possible, and the radio receiver may tune the weights dynamically in response to changing conditions. Moreover, different weights may be used for different resource elements, in order to prevent the filter extending beyond the relevant channel or channels in the frequency axis.

The SNR estimator 1 contains a set of filtered channel estimators 2a, 2b, 2c, corresponding to different respective CRS resource elements for difference subcarriers. For simplicity, only three filtered channel estimators 2a, 2b, 2c are shown in FIG. 1, but it will be appreciated that the SNR estimator 1 will typically contain more than this. These filtered channel estimators 2a, 2b, 2c access unfiltered channel estimates, $\hat{h}_{CRS}(i)$, and calculate $\hat{h}_{filt}(i)$ values as shown above for respective resource elements.

Each filtered channel estimator 2a, 2b, 2c outputs successive filtered channel estimates at regular intervals. These are received by respective signal-and-power estimation blocks 3a, 3b, 3c.

Each signal-and-power estimation block 3a, 3b, 3c generates a signal power estimate and a noise power estimate. The signal power estimate is calculated as:

$$\hat{P}_S(i) = \frac{1}{1-\alpha_0} \mathcal{R}\left\{\hat{h}_{CRS}(i)\left(\hat{h}_{filt}(i) - \alpha_0 \hat{h}_{CRS}(i)\right)^*\right\}$$

where * denotes the complex conjugate, and $\mathcal{R}\{\}$ returns the real component of the expression in the brackets. Here, the $\hat{h}_{CRS}(i)$ term is a "first channel estimate", as described above, and the $(\hat{h}_{filt}(i) - \alpha_0 \hat{h}_{CRS}(i))^*$ is a "second channel estimate", as described above.

As can be seen more clearly from the following two equivalent expressions, this has the effect of removing the $\hat{h}_{CRS}(i)$ term from the middle of the filtered channel estimate, such that the signal power estimate is based on a modified filtered channel estimate that has no $\hat{h}_{CRS}(i)$ term in it.

$$\hat{P}_S(i) = \frac{1}{1-\alpha_0} \mathcal{R}\left\{\hat{h}_{CRS}(i)\left(\alpha_{-\lfloor \frac{K}{2} \rfloor}\hat{h}_{CRS}\left(i - \left\lfloor \frac{K}{2} \right\rfloor\right)\right) + \ldots \alpha_{-1}\hat{h}_{CRS}(i-1) + \right.$$
$$\left. \alpha_1 \hat{h}_{CRS}(i+1) + \ldots + \alpha_{\lfloor \frac{K}{2} \rfloor}\hat{h}_{CRS}\left(i + \left\lfloor \frac{K}{2} \right\rfloor\right)\right)^*\right\}$$
$$= \frac{1}{1-\alpha_0} \mathcal{R}\left\{\hat{h}_{CRS}(i)\left(\sum_{k \neq 0} \alpha_k \hat{h}_{CRS}(i+k)\right)^*\right\}$$

This means that the signal power estimate does not contain a squared $\hat{h}_{CRS}(i)$ term. The benefits of this are explained below.

In some other embodiments, additional terms may be absent from the filtered channel estimate and present in the $\hat{h}_{CRS}(i)$ term, so that calculating the signal power estimate includes multiplying the sum of a first plurality of unfiltered channel estimates, including $h_{CRS}(i)$ (defining a "first channel estimate"), by the conjugate of the sum of second set of one or more unfiltered channel estimates (defining a "second channel estimate"), where the second set does not include any of the first plurality of unfiltered channel estimates.

The noise power estimate is calculated as:

$$\hat{P}_N(i) = \left| \hat{h}_{CRS}(i) - \frac{1}{1-\alpha_0} \left( \hat{h}_{filt}(i) - \alpha_0 \hat{h}_{CRS}(i) \right) \right|^2$$

Again, the $\hat{h}_{CRS}(i)$ term is removed from the middle of the filtered channel estimate.

This can be expressed in terms of the modified filtered channel estimate, as:

$$\hat{P}_N(i) = \left| \hat{h}_{CRS}(i) - \frac{1}{1-\alpha_0} \left( \sum_{k \neq 0} \alpha_k \hat{h}_{CRS}(i+k) \right) \right|^2$$

The signal-and-power estimation block may calculate this value by any mathematically-equivalent set of operations. It may calculate the modified filtered channel estimate and store this value in memory as an intermediate result, although this is not essential.

If the original filtered channel estimate is retained in the expression, the noise power estimate can also be written as:

$$\hat{P}_N(i) = \left| \frac{1}{1-\alpha_0} \left\{ (1-\alpha_0) \hat{h}_{CRS}(i) - \hat{h}_{filt}(i) + \alpha_0 \hat{h}_{CRS}(i) \right\} \right|^2$$

$$= \left| \frac{1}{(1-\alpha_0)} \left( \hat{h}_{CRS}(i) - \hat{h}_{filt}(i) \right) \right|^2$$

$$= \left| \frac{1}{\sum_{k \neq 0} \alpha_k} \left( \hat{h}_{CRS}(i) - \hat{h}_{filt}(i) \right) \right|^2$$

$$= \frac{1}{(1-\alpha_0)^2} \left| \left( \hat{h}_{CRS}(i) - \hat{h}_{filt}(i) \right) \right|^2$$

Thus, the noise power estimate may alternatively be calculated by subtracting the filtered channel estimate from the unfiltered channel estimate, for the particular reference signal, and dividing this by a constant factor equal to one minus the respective reference-signal coefficient for the particular reference signal, then taking the absolute square of this quotient.

Because both the noise power estimate and the signal power estimate can be calculated using the modified filtered channel estimate, this can efficiently be calculated once and used for both estimates. Each signal-and-power estimation block 3a, 3b, 3c receives an unfiltered channel estimate for a respective subcarrier resource element, which it multiplies by the value ($-\alpha_0$) and adds to the filtered channel estimate. The result of this sum is then multiplied by $$\frac{1}{1-\alpha_0}.$$

The result of this multiplication is then sent to a signal power estimator block 4a and also to a noise power estimator block 5a. The other signal-and-power estimation blocks 3b, 3c have similar signal power estimator blocks and noise power estimator blocks.

The signal-power estimator block 4a takes the complex conjugate of its input, multiplies this by the unfiltered channel estimate for the respective resource element, and outputs the real component of this multiplication.

The noise-power estimator block 5a multiplies its input by minus one and adds it to the unfiltered channel estimate for the respective resource element. It then calculates the absolute square of this sum, which it outputs as a noise power estimate for the particular resource element. This can serve as a noise power estimate for the corresponding subcarrier, over a given time window.

The outputs of the noise-power estimator blocks 5a for the respective signal-and-power estimation blocks 3a, 3b, 3c are all input to a linear averaging block 6, which calculates a linear average (i.e., arithmetic mean) value across the subcarriers. This gives an average noise power estimate for the whole channel.

The output of each signal-power estimator block 4a enters a respective SNR estimator block 7a, 7b, 7c, which also receives the average noise power estimate from the linear averaging block 6. Each SNR estimator block 7a, 7b, 7c divides the subcarrier-specific signal power estimate by the average noise power estimate to generate an SNR estimate for the respective subcarrier.

The SNR estimates are output from the respective SNR estimator blocks 7a, 7b, 7c to a common linear or non-linear filtering block 8, which can perform optional linear or non-linear filtering over time and/or frequency. The degree of filtering that is appropriate at this stage may vary depending on the application requirements.

The improved performance of the new approaches to signal power estimation, disclosed herein, can be more fully appreciated from the following analysis.

An unfiltered channel estimate, $\hat{h}_{CRC}(i)$, is composed of a true channel coefficient and additive noise, $\hat{h}_{CRS}(i) = h(i) + n(i)$, where $h(i)$ and $n(i)$ denote a true channel coefficient and a noise sample, respectively.

Assume, for simplicity, that the channel is constant over the frequency and time resources that are used to generate the filtered channel estimates—i.e., $h(i) = h(j)$, $\forall j \neq i$. Assume also that the receiver noise is additive white Gaussian noise—i.e. the noise samples are uncorrelated, so $E[n(i)n(j)^*] = E[n(i)]E[n(j)^*]$, $\forall i \neq j$.

Then the signal power estimate $\hat{P}_s(i)$ can be written as:

$$\hat{P}_S(i) = |h(i)|^2 + \mathcal{R} \left\{ \sum_{k \neq 0} \alpha_k n(i) n(i+k)^* \right\}$$

This contrasts with the known approach of estimating signal power as the absolute square of the filtered channel estimate, which, under the above assumptions, results in $$\hat{P}_S(i) = \left| \hat{h}_{filt}(i) \right|^2$$

$$= |h(i)|^2 + \sum_k |\alpha_k|^2 |n(i+k)|^2 + \sum_{k,l \neq k} \alpha_k \alpha_l n(i+k) n(i+l)^* +$$

$$\sum_{k,l\neq k}\alpha_k\alpha_l n(i+k)^*n(i+l)$$

The $|h(i)|^2$ term of this last equation is desired. The last two noise cross-correlation terms vanish to zero as the number of resource elements, i, in the filter increases. Also post-processing averaging can decrease these last two terms further. The second term, $\Sigma_k|\alpha_k|^2|n(i+k)|^2$, however, has been found to cause very large errors for signal estimation when SNR<<0 dB. This term does not appear in the signal power estimates generated by embodiments of the invention, which only has cross-correlation terms and no squared noise terms.

Under the same assumptions as above, the noise power estimate for a CRS RE i, on a particular subcarrier, can then be written as:

$$\hat{P}_N(i) = \left| n(i) - \sum_{k\neq 0} \frac{\alpha_k}{1-\alpha_0} n(i+k) \right|^2$$

$$\approx |n(i)|^2$$

The summand term is undesired, but tends to zero as the number of resource elements in the filter increases.

This contrasts with the known approach of estimating noise power as the absolute square of the difference between a filtered channel estimate and an unfiltered channel estimate, which, under the above assumptions, results in:

$$\hat{P}_N(i) = \left| (1-\alpha_0)n(i) - \sum_{k\neq 0} \alpha_k n(i+k) \right|^2$$

$$\approx (1-\alpha_0)^2 |n(i)|^2$$

The applicant has found that this $(1-\alpha_0)^2$ coefficient can scale down the sample noise power estimate and thus can cause a constant, small error in the estimate. This problem is overcome in the noise power estimates generated by embodiments of the invention.

When a signal power estimate, generated as described herein, is divided by an average noise power estimate, generated as described herein, the SNR estimate asymptotically approaches the true SNR value:

$$\hat{\gamma}_i \to \frac{|h(i)|^2}{|n(i)|^2},$$

as the number of CRS resource elements is increased.

This contrasts with a known SNR estimator, described earlier, which asymptotically approaches the value of:

$$\hat{\gamma}_i = \frac{\hat{P}_S(i)}{\hat{P}_N(i)} \to \frac{|h(i)|^2 + \Sigma_k \alpha_k^2 |n(i+k)|^2}{(1-\alpha_0)^2 |n(i)|^2},$$

as the number of CRS resource elements is increased.

When true SNR>>0 dB, the error term $\Sigma_k \alpha_k^2 |n(i+k)|^2 << |h(i)|^2$, and the known SNR estimator gives accurate enough results.

However, when true SNR<<0 dB, the error term $\Sigma_k \alpha_k^2 |n(i+k)|^2 >> |h(i)|^2$, which means that the known SNR estimator saturates with $$\hat{\gamma}_i \approx \frac{\Sigma_k \alpha_k^2 |n(i+k)|^2}{(1-\alpha_0)^2 |n(i)|^2}.$$

But an SNR estimator generated by embodiments of the invention will asymptotically approach the true SNR value irrespective of the SNR region it is operating on.

Figure 2:
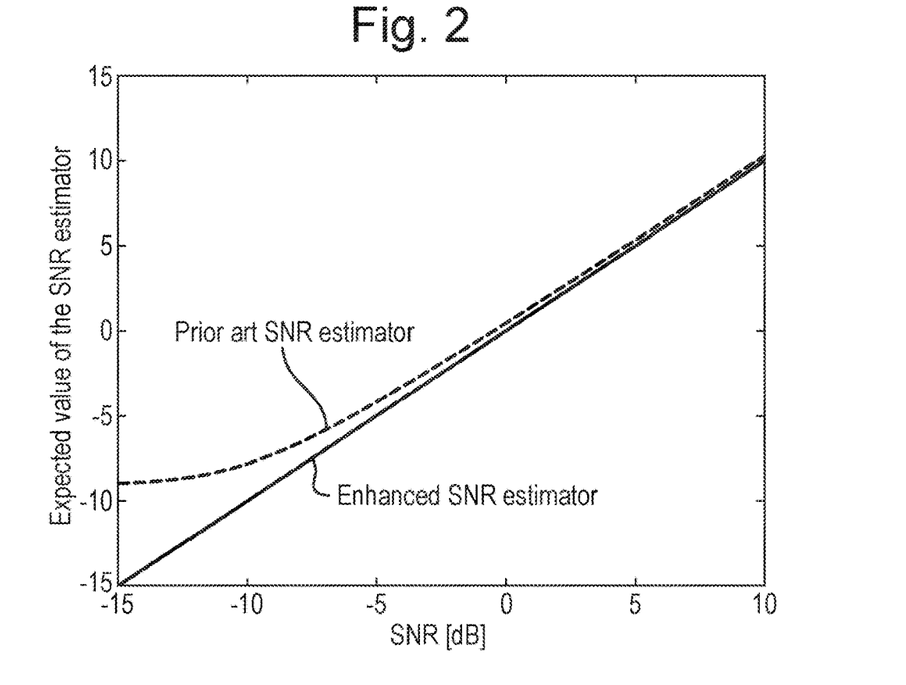
FIG. 2 is graph showing the performance of the SNR estimator relative to a prior-art approach and a theoretical optimum.

FIG. 2 shows the simulated performance of a novel SNR estimator as disclosed herein, compared with a known SNR estimator that generates signal and noise estimates using the prior-art approaches described above. The graph also shows the ideal performance. As can be seen, the expected value of the novel SNR estimator is very close to the true SNR value across the whole measured SNR range, from −15 dB to +10 dB. By contrast, the expected value of the prior-art SNR estimator starts to saturate when the true SNR<−5 dB. The novel SNR estimator will therefore perform well in, for example, the CQI-based link adaptation for LTE Cat-M1 when operating in CE-mode A, where the prior-art SNR estimator would not work properly.

Figure 3:
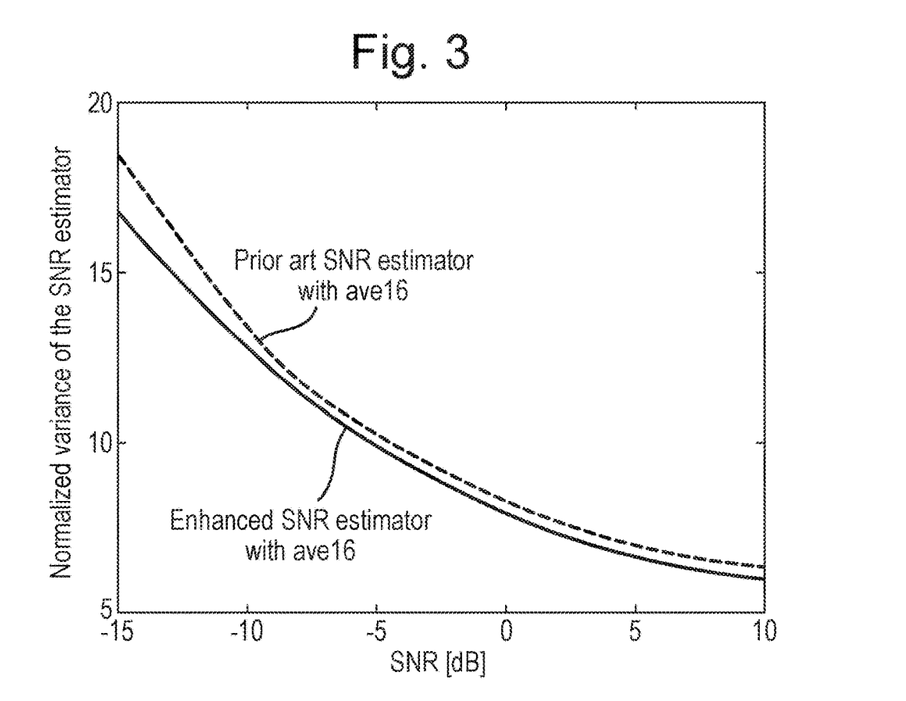
FIG. 3 is graph showing the performance of the SNR estimator relative to a prior-art approach.

FIG. 3 is a simulation comparison of the normalized variance of the novel SNR estimator with the normalized variance of a prior-art SNR estimator. It is based on LTE subframe-based SNR estimates which are further averaged over 16 subframes ("ave16"). The normalized variance of the novel SNR estimator is better (lower) than that of the prior-art SNR estimator. There are errors terms which remain in the prior-art SNR estimation approach even after post-filtering of the SNR estimates, which makes it unreliable.

Figure 4:
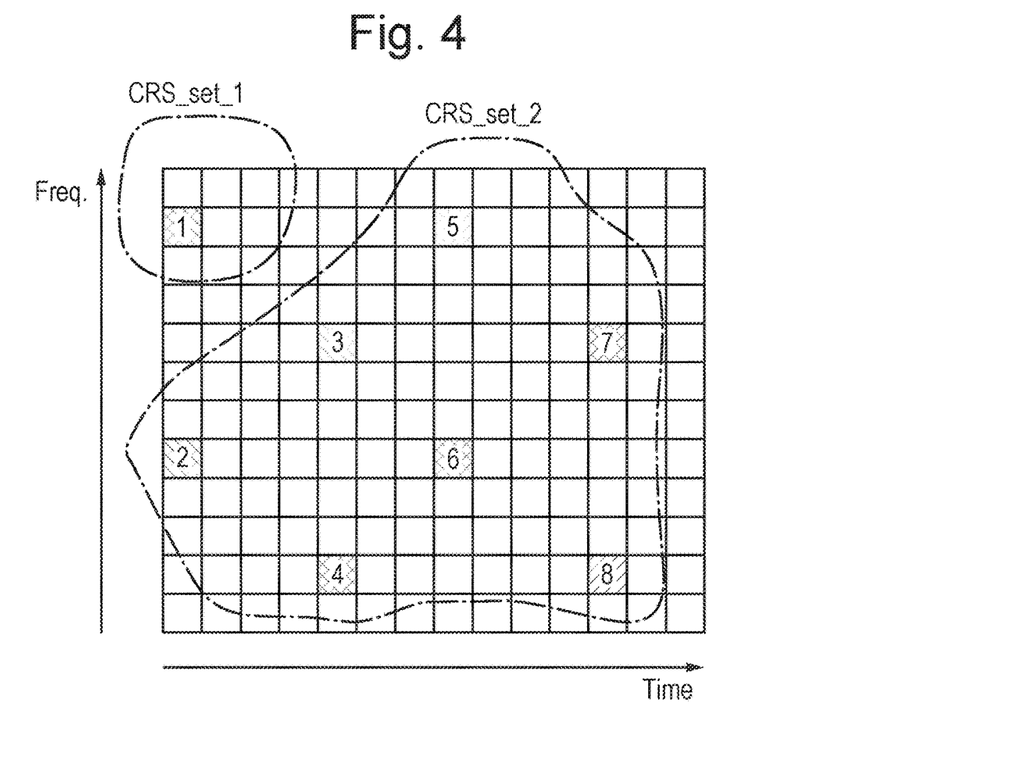
FIG. 4 is an NB-IoT resource grid showing two sets of reference symbols which are used for estimating signal power for a first reference symbol in a method embodying the invention.

FIG. 4 shows an NB-IoT resource grid. This relates to an embodiment that is similar to the embodiments described above, but which is used to receive NarrowBand-IoT signals, instead of LTE-M. The SNR estimator has the same structure as shown in FIG. 1.

FIG. 4 illustrates the CRS resource elements that are involved in generating a signal power estimate for the resource element labelled "1". In NB-IoT downlink carrier uses one LTE physical resource block in the frequency domain, which is twelve 15 kHz subcarriers. All twelve subcarriers are shown in FIG. 4. In this example, the filter window occupies the entire NB-IoT channel in the frequency axis, and is one subframe (1 millisecond) wide in the time axis. Because it occupies the full frequency width, it slides only in the time direction. (Of course, a small filter window could be defined that moves along both the frequency and the time axes.)

The signal power estimate is generated by multiplying a first channel estimate, which is a first function of a first set of one or more unfiltered reference-signal channel estimates, with a second channel estimate, which is a second function of a second set of one or more unfiltered reference-signal channel estimates. In this case, the first set consists only of an unfiltered channel estimate for the RE labelled "1" in FIG. 4, and the first function is trivial, such that the first channel estimate is simply the unfiltered channel estimate for the resource element "1". The second set consists of unfiltered channel estimates for the remaining seven RE's in FIG. 4. The second function multiplies each of these unfiltered channel estimates by the respective weights and sums the products, as described above.

Figure 5:
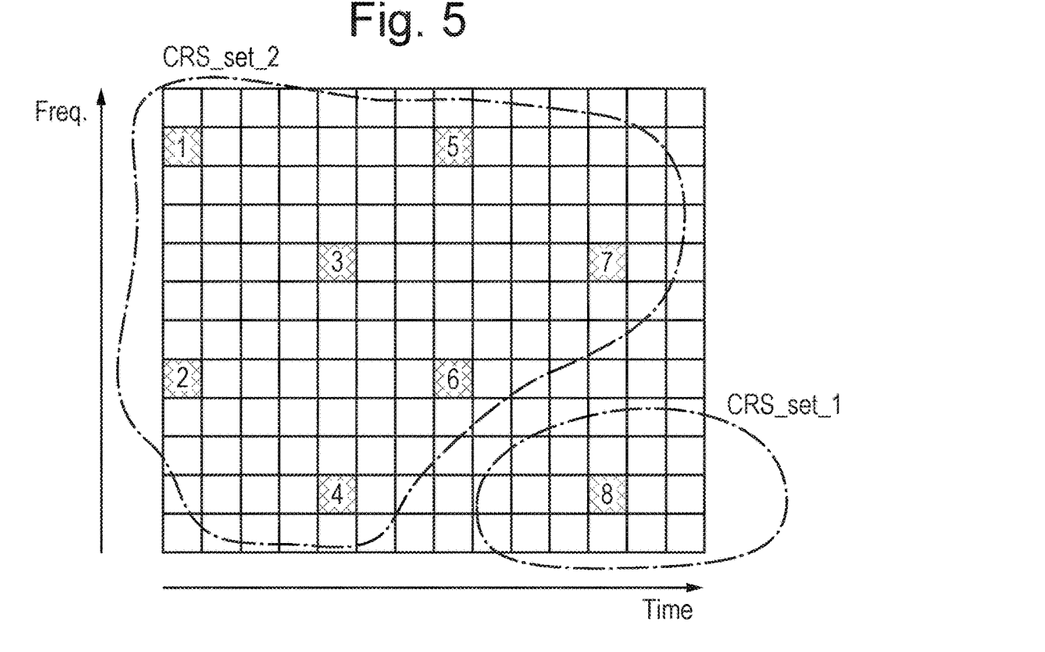
FIG. 5 is the same NB-IoT grid showing two different sets of the reference symbols which are used for estimating signal power for a second reference symbol.

FIG. 5 shows how the identity of the first and second sets of unfiltered reference-signal channel estimates may change depending on the position of the resource element in the resource grid for which the signal power estimate is being calculated.

In this case, when calculating a signal power estimate for the RE labelled "8", the first set consists of the unfiltered channel estimate for the RE "8", while the second set consists of the unfiltered channel estimates for the seven RE's indicated in FIG. 5. The same shaped filter used for RE "1" in FIG. 4 could not be used for RE "8" because the filter would cover frequencies that lie outside the NB-IoT channel.

It is, of course, possible that the first set could contain unfiltered channel estimates for two or more resource elements, with the second set containing unfiltered channel estimates for any number of other resource elements.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of generating a noise power estimate for a particular reference signal received on a particular subcarrier, from among a plurality of OFDM subcarriers, the method comprising generating the noise power estimate as an absolute square of a difference divided by a constant factor, wherein:
the difference is between i) an unfiltered channel estimate for the particular reference signal and ii) a filtered channel estimate for the particular reference signal;
the filtered channel estimate for the particular reference signal is a sum of the products of i) unfiltered reference-signal channel estimates for a filter set of reference signals with ii) respective reference-signal coefficients from a filter set of reference-signal coefficients;
the filter set includes the particular reference signal;
the respective reference-signal coefficients sum to one; and
the constant factor is equal to one minus the respective reference-signal coefficient for the particular reference signal.

2. The method of claim 1, wherein the filter set of reference signals includes reference signals received on at least two different respective subcarriers from the plurality of OFDM subcarriers.

3. The method of claim 1, wherein generating the noise power estimate comprises:
calculating said difference;
dividing said difference by the constant factor; and
calculating the absolute square of the difference divided by the constant factor.

4. The method of claim 1, wherein generating the noise power estimate comprises:
calculating a modified filtered channel estimate that is equal to the filtered channel estimate minus a product of the unfiltered reference-signal channel estimate for the particular reference signal with the respective reference-signal coefficient for the particular reference signal;
dividing the modified filtered channel estimate by the constant factor to determine a quotient; and
calculating, as the noise power estimate, an absolute square of a difference between the unfiltered reference-signal channel estimate for the particular reference signal and said quotient.

5. The method of claim 4, further comprising using the modified filtered channel estimate to generate a signal power estimate for the particular reference signal, wherein generating the signal power estimate comprises multiplying the unfiltered reference-signal channel estimate for the particular reference signal by the modified filtered channel estimate, or by a complex conjugate of the modified filtered channel estimate, such that the generated signal power estimate does not increase with an absolute square of any of the unfiltered reference-signal channel estimates.

6. The method of claim 1, wherein the particular subcarrier is a radio-frequency subcarrier.

7. The method of claim 1, wherein the particular reference signal and the filter set of reference signals are Long Term Evolution (LTE) Cell-Specific Reference Signals (CRS) resource elements (RE).

8. The method of claim 1, further comprising receiving and demodulating the particular reference signal.

9. A noise estimator for an OFDM radio receiver, comprising a hardware module and/or a processor and memory storing software for execution by the processor configured to generate a noise power estimate for a particular reference signal received on a particular subcarrier, from among a plurality of OFDM subcarriers, as an absolute square of a difference divided by a constant factor, wherein:
the difference is between i) an unfiltered channel estimate for the particular reference signal and ii) a filtered channel estimate for the particular reference signal;
the filtered channel estimate for the particular reference signal is a sum of products of i) unfiltered reference-signal channel estimates for a filter set of reference signals with ii) respective reference-signal coefficients from a filter set of reference-signal coefficients;
the filter set includes the particular reference signal;
the respective reference-signal coefficients sum to one; and
the constant factor is equal to one minus the respective reference-signal coefficient for the particular reference signal.

10. The noise estimator of claim 9, wherein the hardware module and/or the processor is configured to generate the filtered channel estimate by multiplying each of the unfiltered reference-signal channel estimates for the filter set by the respective reference-signal coefficient to generate a set of products, and summing products in the set of products.

11. The noise estimator of claim 9, wherein the filter set of reference signals includes reference signals received on at least two different respective subcarriers from the plurality of OFDM subcarriers.

12. The noise estimator of claim 9, wherein the hardware module and/or the processor is configured to generate the noise power estimate by:
calculating said difference;
dividing said difference by the constant factor; and
calculating an absolute square of the difference divided by the constant factor.

13. The noise estimator of claim 9, wherein the hardware module and/or the processor is configured to generate the noise power estimate by:
calculating a modified filtered channel estimate that is equal to the filtered channel estimate minus a product of the unfiltered reference-signal channel estimate for the particular reference signal with the respective reference-signal coefficient for the particular reference signal;
dividing the modified filtered channel estimate by the constant factor to determine a quotient; and calculating, as the noise power estimate, an absolute square of a difference between the unfiltered reference-signal channel estimate for the particular reference signal and said quotient.

14. The noise estimator of 13, wherein the hardware module and/or the processor is further configured to use the modified filtered channel estimate to generate a signal power estimate for the particular reference signal, wherein generating the signal power estimate comprises multiplying the unfiltered reference-signal channel estimate for the particular reference signal by the modified filtered channel estimate, or by a complex conjugate of the modified filtered channel estimate, such that the generated signal power estimate does not increase with the absolute square of any of an unfiltered reference-signal channel estimates.

15. A signal estimator for an OFDM radio receiver, comprising a hardware module and/or a processor and memory storing software for execution by the processor configured to generate a signal power estimate for a particular reference signal received on a particular subcarrier, from among a plurality of OFDM subcarriers, by:

generating a first channel estimate as a first function of a first set of one or more unfiltered reference-signal channel estimates, the first set including an unfiltered reference-signal channel estimate for the particular reference signal;

generating a second channel estimate as a second function of a second set of one or more unfiltered reference-signal channel estimates, wherein the second set of unfiltered reference-signal channel estimates has no unfiltered reference-signal channel estimate in common with the first set of unfiltered reference-signal channel estimates; and generating the signal power estimate, wherein generating the signal power estimate comprises multiplying the first channel estimate by the second channel estimate, such that the generated signal power estimate does not increase with an absolute square of any of the unfiltered reference-signal channel estimates in the first and second sets of unfiltered reference-signal channel estimates.

\* \* \* \* \*